United States Patent [19]

Itoh et al.

[11] Patent Number: 5,232,773

[45] Date of Patent: Aug. 3, 1993

[54] HOLLOW BLOW-MOLDED POLYBUTYLENE TEREPHTHALATE RESIN ARTICLES

[75] Inventors: Haruyasu Itoh; Masato Suzuki, both of Shizuoka, Japan

[73] Assignee: Polyplastics Co., Ltd., Osaka, Japan

[21] Appl. No.: 735,003

[22] Filed: Jul. 25, 1991

[30] Foreign Application Priority Data

Jul. 25, 1990 [JP] Japan .................. 2-197004

[51] Int. Cl.$^5$ .............. B32B 1/06; B32B 25/00; C08G 63/48; C08G 63/91
[52] U.S. Cl. .............. 428/313.5; 428/313.9; 528/272; 528/288; 528/293; 528/297; 528/301; 525/64
[58] Field of Search ............ 528/272, 288, 293, 297, 528/301; 525/64; 428/313.5, 313.9

[56] References Cited

U.S. PATENT DOCUMENTS

| | | | |
|---|---|---|---|
| 3,931,114 | 1/1976 | Gall et al. | 528/308.6 |
| 4,369,280 | 1/1983 | Dieck et al. | 524/281 |
| 4,542,174 | 9/1985 | Godlewski | 524/262 |
| 4,590,259 | 5/1986 | Kosky et al. | 528/272 |
| 4,742,109 | 5/1988 | Takahashi et al. | 525/64 |
| 5,112,914 | 5/1992 | Mizuno et al. | 525/134 |
| 5,116,906 | 5/1992 | Mizuno et al. | 525/68 |

FOREIGN PATENT DOCUMENTS

0262929  4/1988  European Pat. Off. .
0295706  12/1988  European Pat. Off. .
WOA190/02-155  3/1990  PCT Int'l Appl. .

OTHER PUBLICATIONS

Patent Abstracts of Japan, unexamined applications, C field, vol. 13, No. 156, Apr. 14, 1989.

*Primary Examiner*—John Kight, III
*Assistant Examiner*—Jeffrey Culpeper Mullis
*Attorney, Agent, or Firm*—Nixon & Vanderhye

[57] ABSTRACT

Blow-moldable polybutylene terephthalate resin compositions include a polybutylene terephthalate base polymer and an effective amount of between 0.01 to 5 parts by weight (based on 100 parts by weight of the polybutylene terephthalate base polymer) of an organosilane compound to allow blow-molding of hollow articles therefrom. Optionally, the compositions further include between 0.5 to 30 parts by weight, based on 100 parts by weight of the polybutylene terephthalate base polymer, of an olefinic copolymer of an α-olefin with an α,β-unsaturated glycidyl ester. The organosilane and, when present, the olefinic copolymer increase the melt tension of the compositions to an extent that a tubular parison does not increase more than 25% in length when suspended under its own weight for 10 seconds. In this manner, the polybutylene terephthalate resin compositions may be satisfactorily used to form blow-molded hollow articles.

10 Claims, No Drawings

HOLLOW BLOW-MOLDED POLYBUTYLENE TEREPHTHALATE RESIN ARTICLES

FIELD OF THE INVENTION

The present invention generally relates to blow-molding processes used to form hollow articles of a blow-moldable resin. More specifically, the present invention relates to processes whereby a polybutylene terephthalate resin is blow-molded to form hollow articles thereof.

BACKGROUND AND SUMMARY OF THE INVENTION

Crystalline thermoplastic polybutylene terephthalate (PBT) resins have been used extensively as an engineering plastic in various fields owing to their excellent mechanical and electrical properties, as well as their physical and chemical characteristics. Thus, thermoplastic PBT resins have been used to form molded parts in various fields including automotive, electrical and electronic end-use applications.

PBT resins have typically not been employed as a feedstock for blow-molding operations since the intermediate hollow parison that is formed during the blow-molding process is undesirably "drawn-down" due to the poor melt tension that conventional PBT resin exhibits. Thus, hollow blow-molded articles have typically not been produced from PBT resins. Instead, PBT resins are conventionally thought of as an injection-moldable resin from which hollow injection-molded articles may be produced.

Prior attempts at forming hollow articles of PBT resins by blow-molding techniques have included increasing the molecular weight of the PBT resin so as to obtain a corresponding increase in melt strength (melt tension) and melt viscosity, since greater molecular weight typically results in a greater melt strength for a given resin. However, merely increasing the molecular weight of PBT resin to thereby increase its melt viscosity does not achieve the needed melt strength sufficient to employ PBT resins in blow-molding processes. Furthermore, the addition of inorganic filler materials has also been attempted as a means to increase the melt viscosity and melt strength of PBT resins sufficiently to allow blow-molding of hollow articles. Again, however, simply adding an inorganic filler to PBT resins (even those having an increased molecular weight) does not achieve the necessary melt strength properties necessary to allow the resin to be processed by blow-molding techniques.

What has been needed in this art therefore, is a PBT resin composition which exhibits sufficient melt tension characteristics so that it could be employed economically in blow-molding processes. It is towards satisfying such a need that the present invention is directed.

Broadly, the present invention relates to novel blow-moldable PBT resins and to blow-molding processes for producing hollow articles of such PBT resins. More specifically, the present invention relates to blow-moldable PBT resins comprised of a PBT base polymer and an effective amount of between 0.01 to 5 parts by weight (based on 100 parts by weight of the PBT base polymer) of at least one organosilane compound. Preferred organosilane compounds are alkoxysilane compounds including vinylalkoxysilanes, epoxyalkoxysilanes, aminoalkoxysilanes, allylalkoxysilanes and mercaptoalkoxysilanes. One or more of these compounds are melt-blended with the PBT base polymer prior to blow molding.

Optionally, the PBT resin compositions of this invention may include a minor (but effective) amount of an olefinic copolymer. The preferred olefinic copolymer that may optionally be incorporated in the PBT resin compositions of this invention include copolymers of an $\alpha$-olefin with an $\alpha,\beta$-unsaturated glycidyl ester. This olefinic copolymer may further be grafted with a vinyl copolymer to form a branched or crosslinked structure that is effective to improve the melt tension of the PBT resin composition and thereby enhance it blow-moldability.

Other aspects and advantages of this invention will become apparent after careful consideration is given to the detailed description of the preferred exemplary embodiments thereof which follow.

DETAILED DESCRIPTION OF THE PREFERRED EXEMPLARY EMBODIMENTS

The polybutylene terephthalate base polymers used in the compositions of the present invention include polyesters comprised mainly of recurring butylene terephthalate units. In particular, the preferred base polymers are polyesters obtained by condensing 1,4-butanediol with terephthalic acid or its lower alcohol ester. The polybutylene terephthalate base polymer is not limited strictly to PBT homopolymers, but also includes copolymers mainly comprised of polybutylene terephthalate units. The term "copolymers" as used herein thus refers to polymers obtained by the polycondensation of terephthalic acid or its lower alcohol ester as the main dibasic acid component with 1,4-butanediol as the main glycol component in the presence of 40 molar % or less of an ester-forming monomer. The comonomer components usable herein include dibasic acid components such as isophthalic acid, orthophthalic acid, adipic acid, sebacic acid, succinic acid and oxalic acid as well as their lower alcohol esters; and glycol components such as ordinary alkylene glycols other than 1,4-butanediol, e.g. ethylene glycol, diethylene glycol, propylene glycol, trimethylene glycol, hexamethylene glycol, neopentyl glycol and cyclohexanedimethanol as well as aromatic diols, e.g. bisphenol A and ethylene oxide (2 mol) adduct of bisphenol A.

Hydroxy acids such as hydroxybenzoic acid and hydroxynaphthoic acid and their ester-forming derivatives may also be used as suitable comonomers. Furthermore, comonomers having halogen substituents are also usable and are effective in imparting flame retardancy to the resulting blow-molded articles.

In addition, copolyesters having a branched structure obtained by the polycondensation of a polyfunctional comonomeric compound having three or more reactive groups may also be employed as the PBT base polymer. The polyfunctional compounds usable herein include trimesic acid, trimellitic acid, pyromellitic acid and alcoholic esters thereof as well as glycerol, trimethylolethane, trimethylolpropane and pentaerythritol.

The PBT base polymer that may be used in the present invention is preferably one having an intrinsic viscosity (IV) within the range of 0.7 to 2.0, particularly 1.0 to 1.6. PBT resins having an intrinsic viscosity of less than 0.7 exhibit insufficient melt tension and cannot be blow-molded even if the organosilane component of the present invention is melt-blended therewith. On the contrary, an intrinsic viscosity exceeding 2.0 is unfavorable because the fluidity of the resin composition is poor. Furthermore, the extrusion moldability property of PBT resins having an IV of greater than 2.0 is impaired due to overloading of the extruder motor and pressure increases at the die.

The blow-moldable PBT resin compositions and the hollow blow-molded articles produced by such blow-molding processes are especially characterized in that a specified organosilane compound, particularly an alkoxysilane, is melt-blended with the PBT base polymer prior to blow-molding. The addition of the organosilane compound surprisingly and significantly increases the melt tension of the PBT resin. As a result, the PBT compositions may be blow-molded which has been extremely difficult using conventional PBT resins of any viscosity (molecular weight). Thus, hollow blow-molded articles having a stable quality can be obtained.

The organosilane compounds usable herein are preferably alkoxysilanes such as vinylalkoxysilanes, epoxyalkoxysilanes, aminoalkoxysilanes, allylalkoxysilanes and mercaptoalkoxysilanes. They can be used either alone or in combinations of two or more of the same.

Examples of the vinylalkoxysilanes include vinyltriethoxysilane, vinyltrimethoxysilane and vinyltris($\beta$-methoxyethoxy)silane.

Preferred epoxyalkoxysilanes include $\gamma$-glycidoxypropyltrimethoxysilane, $\beta$-(3,4-epoxycyclohexyl)ethyltrimethoxysilane and $\gamma$-glycidoxypropyltriethoxysilane. Examples of the aminoalkoxysilanes include $\gamma$-aminopropyltriethoxysilane, $\gamma$-aminopropyltriethoxysilane, $\gamma$-aminopropylmethyldimethoxysilane, $\gamma$-aminopropylmethyldiethoxysilane, N-($\beta$-aminoethyl)-$\gamma$-aminopropyltrimethoxysilane and N-phenyl-$\gamma$-aminopropyltrimethoxysilane.

Examples of the allylalkoxysilanes include $\gamma$-diallylaminipropyltrimethoxysilane, $\gamma$-allylaminopropyltrimethoxysilane and $\gamma$-allylthiopropyltrimethoxysilane. Examples of the mercaptoalkoxysilanes include alkoxysilanes such as $\gamma$-mercaptopropyltrimethoxysilane and $\gamma$-mercaptopropyltriethoxysilane.

The amount of the organosilane compound to be melt-blended with the PBT base polymer in the compositions of the present invention is between 0.01 to 5 parts by weight, preferably between 0.1 to 3 parts by weight, per 100 parts by weight of the PBT base polymer. When the organosilane compound is present in an amount less than 0.01 part by weight, the intended effect to increase melt tension cannot be obtained. On the other hand, when excess amounts of the organosilane compound are employed, side reactions occur during melt-blending and/or blow-molding which abnormally increases the composition's viscosity.

It is especially preferred (but not necessary) to include in the compositions of this invention an olefinic copolymer comprising an $\alpha$-olefin and a glycidyl ester of an $\alpha,\beta$-unsaturated acid, or a graft copolymer produced by chemically bonding such a copolymer to a vinyl (co)polymer to form a branched or crosslinked structure.

The olefinic copolymers comprising an $\alpha,\beta$-unsaturated acid are those containing a copolymer of an $\alpha$-olefin such as ethylene, propylene or butene-1 with a glycidyl ester of an $\alpha,\beta$-unsaturated acid, such as glycidyl acrylate, glycidyl methacrylate, glycidyl ethacrylate or glycidyl itaconate, in the molecular structure thereof. Among them, a copolymer of ethylene with glycidyl methacrylate can be preferably used.

A graft copolymer comprising the above-described copolymer and a vinyl (co)polymer further chemically bonded thereto form a branched or crosslinked structure is an especially preferred copolymer to be used in combination with the resin. The vinyl (co)polymer segment herein is a polymer or copolymer such as polystyrene, polyacrylonitrile, polyalkyl acrylate or polyalkyl methacrylate. Among them, olefinic graft copolymers (having a multilayered structure) described in Japanese Patent Laid-Open No. 312313/1988 are particularly preferably used in the blow-moldable compositions of the present invention.

The amount of the olefinic copolymer used in the present invention is not more than 30 parts by weight, preferably between 0.5 to 20 parts by weight, per 100 parts by weight of the PBT resin. when the amount of the olefinic copolymer is insufficient, the composition blow-moldability typically is unstable. On other hand, when the amount of the olefinic copolymer exceeds 30 parts by weight, the melt viscosity of the composition increases to an extent that extrusion is difficult resulting in problems in the properties of the molded articles.

The amount of the organosilane and, if present, the olefinic copolymer, employed in the polybutylene terephthalate resin compositions of this invention is such that a tubular parison of the composition having an average thickness of about 4 mm does not increase greater than 25% in length when suspended under its own weight for 10 seconds. For example, tubular parisons formed of the PBT compositions of this invention having an average thickness of about 4 mm, a diameter of about 60 mm, and an initial length of about 200 mm will have sufficiently increased melt tension properties such that, after being suspended under its own weight for 10 seconds, the length of the parison will not exceed about 250 mm.

The compositions of this invention may also include a fibrous, powdery, granular or platy inorganic filler materials to the extent that the blow-molding properties are not impaired.

The fibrous fillers may include inorganic fibers such as glass fibers, asbestos fibers, carbon fibers, silica fibers, silica/alumina fibers, zirconia fibers, boron nitride fibers, silicon nitride fibers, boron fibers and potassium titanate fibers and fibrous metals such as stainless steel, aluminum, titanium, copper and brass. Particularly typical fillers are glass fibers.

The powdery or granular fillers may include carbon black; silicates such as silica, quartz powder, glass beads, glass powder, calcium silicate, aluminum silicate, kaolin, talc, clay, diatomaceous earth and wollastonite; metal oxides such as iron oxides, titanium oxides, zinc oxides and alumina; metal carbonates such as calcium carbonate and magnesium carbonate; metal sulfates such as calcium sulfate and barium sulfate; as well as silicon carbide, silicon nitride, boron nitride and various metal powders.

The platy fillers may include mica, glass flakes and various metal foils.

These inorganic fillers can be used either alone or in combinations of two or more of the same. A combination of a fibrous filler, particularly glass fibers, with a granular and/or platy filler is preferred for imparting excellent mechanical strength, dimensional accuracy and electrical properties to the resulting blow-molded articles.

These filers are preferably used in combination with a binder or a surface-treating agent such as a functional compound, e.g. epoxy, isocyanate, titanate and silane compounds.

A minor amount of an auxiliary thermoplastic resin can also be used in the blow-moldable compositions of this invention. The auxiliary thermoplastic resins that may be used include virtually any thermoplastic resin which is stable at a high temperature. Examples of suitable auxiliary thermoplastic resins include polyolefinic (co)polymers (other than the optional olefinic copolymer described above), aromatic polyesters such as polyethylene terephthalate, polyamides, polycarbonates, ABS, polyphenylene oxides, polyphenylene sulfides, polyalkyl acrylates, polyacetals, polysulfones and fluororesins. These thermoplastic resins can be used in the form of a resin mixture of two or more thermoplastic resins.

Known additives usually incorporated in synthetic resin compositions can be added to the PBT resin compositions of the present invention depending on the desired properties to be attained. Suitable known additives include stabilizers such as antioxidants and ultraviolet absorbers; antistatic agents; flame retardants; colorants such as dyes and pigments, lubricants, releasers, crystallization accelerators and nucleating agents.

As described previously, at least the alkoxysilane compound is added to the PBT base polymer. The mixture is then melt-kneaded, and if desired, the olefinic copolymer component may then be added to the PBT/organosilane mixture. If necessary, other desired additives as described above may be incorporated into the mixture. The resultant mixture is melt-kneaded and blow-molded using conventional apparatus. The melt-kneading of the mixture may thus be conducted with a single-screw or twin-screw extruder to form pellets, which are then subjected to the blow-molding process. Alternatively, the melt-kneaded mixture is directly formed into a tubular parison as part of the blow-molding process.

The process for blow-molding the PBT compositions of this invention may be practiced using conventional blow-molding apparatus. In this connection, the PBT resin composition is plasticized with an extruder or the like, and is extruded or injected through an annular die to form a tubular intermediate parison. The tubular parison is then clamped between mold parts forming a mold cavity and a pressurized fluid (e.g. air) is injected into the interior of the clamped parison so that it inflates and conforms to the walls of the mold cavity. The PBT composition is then allowed to cool and solidify at which time the mold is parted and the hollow blow-molded article is removed.

During blow-molding, temperatures of the extruder cylinder and the die are each preferably maintained at between 225° to 280° C., still preferably between 230° to 250° C. The mold temperature is preferably between 40° to 120° C., and more preferably between 60° to 100° C. Although air is most preferably used as the inflation gas due to economic considerations, nitrogen or any other inert gas may be used, if desired. The pressure of the inflation fluid is preferably between 4 to 10 kg/cm$^2$.

The present invention makes it possible to blow-mold PBT resin which has traditionally been extremely difficult to blow-mold. As a result, hollow blow-molded articles having stable qualities and shapes may be obtained. The PBT resin compositions of this invention may thus be used for the production of hollow articles having excellent physical properties which are inherent in the PBT base polymer and may be used under severe operating conditions. For example, the blow-molded articles may be used as automotive parts, components for chemical apparatus and tools, vessels and the like whereby chemical and heat resistance properties are required; and containers for food and drinks due to the gas-barrier properties, and odorless qualities of the PBT base polymer.

The following non-limiting Examples will further illustrate the present invention.

EXAMPLES

Examples 1 to 5 and Comparative Examples 1 to 3

γ-Aminopropyltriethoxysilane and optionally an olefinic copolymer (see Note 2 below) in amounts specified in Table 1 were added to a PBT base resin (homopolymer) having an intrinsic viscosity (IV) of 1.50. The mixture was melt-blended and extruded with a twin-screw extruder at a cylinder temperature of 250° C. for form pellets. The pellets were then molded into a square-column vessel having an average thickness of 4 mm with a blow molding machine (DA-75 mfd. by Placo Col., Ltd.) at a cylinder temperature of 240° C., a die (diameter: 60 mm) temperature of 230° C., a mold temperature of 60° C. and a blowing pressure of 6 kg/cm$^2$. In this step, the moldability (drawdown and film breakage during blow-molding), uniformity of the thickness of the vessel and the vessel's appearance (surface roughening and unevenness) were qualitatively observed. For comparison, the same procedure as that described above was repeated except that no organosilane compound was used. The results are given in Table 1. The evaluation methods were as follows:

1) Parison Drawdown

Parisons were formed by extrusion to a length of 200 mm through a die (diameter: 60 mm, die distance: 6 mm) with the above-described blow molding machine and were suspended under their own weight for 10 seconds. After 10 seconds, the increased length of each parison was measured and classified into groups identified as "minute" (210 mm or below), "small" (210 to 250 mm) and "large" (250 mm or above). Parison breakage under its own weight within the 10 seconds was indicated as "DD".

2) Thickness Uniformity of the Molded Article

The molded square column vessel was cut and the thickness of each of its sides, as well as the thickness of the upper, central and lower parts thereof were determined with a micrometer to examiner thickness changes (%).

3) Breakage During Blow-Molding

The breakage of the material during blow-molding was examined visually and noted when it occurred.

4) Appearance

The surface smoothness (uneveness) was visually observed and classified into four ranks of "excellent", "good", "acceptable" and "bad".

Examples 6 to 15 and Comparative Examples 4 to 6

An organosilane (see Note 1 below) and an olefinic graft copolymer (see Note 2 below) of the varieties and amounts specified in Table 2 were added to a PBT resin (homopolymer) having an intrinsic viscosity of 1.2. The mixture was pelletized and blow-molded to form square hollow vessels. The vessels were evaluated in the same manner as that of Examples 1 to 5. The results are given in Table 2.

Examples 16 to 18 and Comparative Examples 7 and 8

An organosilane compound and, optionally, an olefinic copolymer of the varieties and amounts specified in Table 3 and a glass fiber (diameter: 10 μm, length: 3 mm) as an inorganic filler were added to a PBT resin (homopolymer) having an intrinsic viscosity of 1.2. The mixture was extruded into pellets, which were then blow-molded into hollow square vessels. The vessels were evaluated in the same manner as that described above. The results are given in Table 3.

Examples 19 and Comparative Example 9

A similar test to that of Example 8 and Comparative Example 4 was conducted except that PBT homopolymer was replaced with a PBT copolymer (intrinsic viscosity: 1.2) having 12 molar %, based on the terephthalic acid group, of an isophthalic aid group introduced into the polymer chain. The results were substantially equivalent to those of Example 8 and Comparative Example 4.

Example 20 and Comparative Example 10

A similar procedure to that of Example 8 and Comparative Example 4 was conducted except that the PBT homopolymer was replaced with a branched PBT (intrinsic viscosity: 1.5) having about 0.2 molar %, based on the terephthalic acid group, of a trimellitic acid group introduced into the polymer chain. The results were substantially equivalent or superior to those of Example 8 and Comparative Example 4.

TABLE 1

|  |  | Ex. No. |  |  |  |  | Comp. Ex. No. |  |  |
|---|---|---|---|---|---|---|---|---|---|
|  |  | 1 | 2 | 3 | 4 | 5 | 1 | 2 | 3 |
| PBT [pts. wt.] |  | 100 | 100 | 100 | 100 | 100 | 100 | 100 | 100 |
| Organosilane (note 1) |  | A | A | A | A | A | — | A | — |
| [pts. wt.] |  | 0.5 | 1.0 | 2.0 | 1.0 | 1.0 |  | 10 |  |
| Olefinic copolymer (note 2) |  | — | — | — | E/GMA | E/GMA | — | — | E/GMA |
| [pts. wt.] |  |  |  |  | 5 | 20 |  |  | 20 |
| Inorganic fill [pts. wt.] |  | — | — | — | — | — | — | — | — |
| Moldability | drawdown of parison | small | small | minute | minute | minute | DD | machine halt due to overload | DD |
|  | breakage in blowing | no | no | no | no | no | molding impossible |  |  |
| Molding | thickness uniformity (%) | 25 | 15 | 10 | 10 | 10 | molding impossible |  |  |
|  | appearance | acceptable | good | good | good | good |  |  |  |

TABLE 2

|  |  | Ex. No. |  |  |  |  |  |  |  |  |  |
|---|---|---|---|---|---|---|---|---|---|---|---|
|  |  | 6 | 7 | 8 | 9 | 10 | 11 | 12 | 13 | 14 | 15 |
| PBT [pts. wt.] |  | 100 | 100 | 100 | 100 | 100 | 100 | 100 | 100 | 100 | 100 |
| Organosilane (note 1) |  | A | A | A | A | B | C | D | E | A | A |
| [pts. wt.] |  | 0.1 | 1.0 | 1.0 | 2.0 | 1.0 | 1.0 | 1.0 | 1.0 | 1.0 | 1.0 |
| Olefinic copolymer (note 2) |  | E/GMA-gST | E/GMA-gST | E/GMA-gST | E/GMA-gST | E/GMA-gST | E/GMA-gST | E/GMA-gST | E/GMA-gST | E/GMA-gPMA gAN | E/GMA-gAN |
| [pts. wt.] |  | 10 | 5 | 10 | 10 | 10 | 10 | 10 | 10 | 10 | 10 |
| Inorganic fill [pts. wt.] |  | — | — | — | — | — | — | — | — | — | — |
| Moldability | drawdown of parison | large | minute | minute | minute | minute | minute | minute | minute | minute | minute |
|  | breakage in blowing | no | no | no | no | no | no | no | no | no | no |
| Molding | thickness uniformity (%) | 25 | 10 | 5 | 5 | 5 | 5 | 5 | 5 | 5 | 5 |
|  | appearance | acceptable | excellent | excellent | excellent | excellent | excellent | excellent | excellent | excellent | excellent |

|  |  | Comp. Ex. No. |  |  |
|---|---|---|---|---|
|  |  | 4 | 5 | 6 |
| PBT [pts. wt.] |  | 100 | 100 | 100 |
| Organosilane (note 1) [pts. wt.] |  | — | — | — |
| Olefinic copolymer (note 2) |  | E/GMA-gST | E/GMA-gPMA | E/GMA-gAN |
| [pts. wt.] |  | 10 | 10 | 10 |
| Inorganic fill [pts. wt.] |  | — | — | — |
| Moldability | drawdown of parison | large | large | large |
|  | breakage in blowing | yes | yes | yes |

TABLE 2-continued

|  | Molding | thickness uniformity (%) appearance | molding difficult | molding difficult | molding difficult |
|---|---|---|---|---|---|

TABLE 3

|  |  | Ex. No. | | | Comp. Ex. No. | |
|---|---|---|---|---|---|---|
|  |  | 16 | 17 | 18 | 7 | 8 |
| PBT [pts. wt.] | | 100 | 100 | 100 | 100 | 100 |
| Organosilane (note 1) | | A | A | B | — | — |
| [pts. wt.] | | 1.0 | 1.0 | 1.0 | | |
| Olefinic copolymer (note 2) [pts. wt.] | | — | E/GMA-gST 10 | E/GMA-gST 10 | — | E/GMA-gST 10 |
| Inorganic fill [pts. wt.] | | GF 20 | GF 20 | GF 20 | GF 20 | GF 20 |
| Moldability | drawdown of parison | minute | minute | minute | DD | large |
| | breakage in blowing | no | no | no | molding impossible | yes |
| Molding | thickness uniformity (%) | 10 | less than 5 | less than 5 | molding impossible | molding difficult |
| | appearance | good | good | good | | |

Note 1) Organosilane Compounds

A: γ-aminopropyltriethoxysilane
B: γ-glycidoxypropyltrimethoxysilane
C: γ-mercaptopropyltrimethoxysilane
D: vinyltrimethoxysilane
E: γ-diallylaminopropyltrimethoxysilane Note 2) Olefinic Copolymers:

E/GMA: ethylene/glycidyl methacrylate copolymer (weight ratio: 85/15)
E/GMA-gPAM: graft copolymer onto E/GMA of polymethyl methacrylate (weight ratio: 70-30)
E/GMA-gST: graft copolymer onto E/GMA of polystyrene (weight ratio: 70-30)
E/GMA-gAN: graft copolymer onto E/GMA of polyacrylonitrile (weight ratio: 70-30)

Note 3)

GF: glass fiber

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A blow-molded hollow article which consists essentially of a polybutylene terephthalate resin composition comprising:
   (1) a polybutylene terephthalate base polymer;
   (2) an effective amount between 0.01 to 5 parts by weight, based on 100 parts by weight of the polybutylene terephthalate base polymer, of an organosilane compound sufficient to increase the melt tension of said polybutylene terephthalate base polymer to allow blow-molding thereof; and
   (3) between 0.5 to 30 by weight, based on 100 parts by weight of the polybutylene terephthalate base polymer of an olefinic copolymer of an α,olefin with an α,β-unsaturated glycidyl ester.

2. A blow-moldable polybutylene terephthalate resin composition as in claim 1, wherein said organosilane compound is an alkoxysilane compound.

3. A blow-moldable polybutylene terephthalate resin composition as in claim 2, wherein said alkoxysilane compound is at least one compound selected from the group consisting of vinylalkoxysilanes, epoxyalkoxysilanes, aminoalkoxysilanes, allylalkoxysilanes and mercaptoalkoxysilanes.

4. A blow-moldable polybutylene terephthalate resin composition as in claim 1, wherein the olefinic copolymer is grafted with a vinyl copolymer to form a branched or crosslinked structure.

5. A blow-moldable polybutylene terephthalate resin composition as in claim 1, which further comprises between 1 to 400 parts by weight, based on 100 parts by weight of the polybutylene terephthalate base polymer, of an inorganic filler.

6. A blow-moldable polybutylene terephthalate resin composition as in claim 1, wherein the organosilane is present in an effective amount such that a tubular parison increases no more than 25% in length when suspended under its own weight for 10 seconds.

7. A blow-molded hollow article which consists essentially of a polybutylene terephthalate resin composition comprising:
   (1) a polybutylene terephthalate base polymer,
   (2) an organosilane compound, and
   (3) an olefinic copolymer which is present in an amount between 0.5 to 30 parts by weight, based on the total weight of the polybutylene terephthalate base polymer, effective to increase the melt-tension of said polybutylene terephthalate composition such that a tubular parison thereof having an average thickness of 4 mm increases no more than 25% in length when suspended under its own weight for 10 seconds.

8. A blow-moldable polybutylene terephthalate resin composition as in claim 7, wherein said organosilane compound is an alkoxysilane compound.

9. A blow-moldable polybutylene terephthalate resin composition as in claim 8, wherein said alkoxysilane compound is at least one compound selected from the group consisting of vinylalkoxysilanes, epoxyalkoxysilanes, aminoalkoxysilanes, allylalkoxysilanes and mercaptoalkoxysilanes.

10. A blow-moldable polybutylene terephthalate resin composition as in claim 9, wherein the organosilane compound in present in an effective amount of between 0.01 to 5 parts by weight, based on 100 parts by weight of the polybutylene terephthalate base polymer.

* * * * *

UNITED STATES PATENT AND TRADEMARK OFFICE
CERTIFICATE OF CORRECTION

PATENT NO. : 5,232,773
DATED : August 3, 1993
INVENTOR(S) : Itoh et al

It is certified that error appears in the above-indentified patent and that said Letters Patent is hereby corrected as shown below:

Column 4, line 67, after "These" change "filers" to --fillers--.

Column 6, line 51, after "to" change "examiner" to --examine--.

Column 8, line 3, before "group" change "aid" to --acid--.

Column 12, claim 10, line 1, after "compound" change "in" to --is--

Signed and Sealed this

Fourteenth Day of June, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,232,773
DATED : August 3, 1993
INVENTOR(S) : Itoh, et. al.

Page 1 of 2

It is certified that error appears in the above-indentified patent and that said Letters Patent is hereby corrected as shown below:

Column 9, line 67, change "α,olefin" to --α-olefin--.

Column 10, line 26, after "A" delete "blow-moldable polybutylene terephthalate resin" and insert --blow-molded hollow article--;

line 27, delete "composition";

line 29, after "A" delete "blow-moldable polybutylene terephthalate resin: and insert --blow-molded hollow article--;

line 30, delete "composition";

line 35, after "A" delete "blow-moldable polybutylene terephthalate resin" and insert --blow-molded hollow article--;

line 36, delete "composition";

line 39, after "A" delete "blow-moldable polybutylene terephthalate resin" and insert --blow-molded hollow article--;

line 40, delete "composition";

UNITED STATES PATENT AND TRADEMARK OFFICE
CERTIFICATE OF CORRECTION

PATENT NO. : 5,232,773  
DATED : August 3, 1993  
INVENTOR(S) : Itoh, et. al.

It is certified that error appears in the above-indentified patent and that said Letters Patent is hereby corrected as shown below:

line 44, after "A" delete "blow-moldable polybutylene terephthalate resin: and insert --blow-molded hollow article--;

line 45, delete "composition;

line 63, after "A" delete "blow-moldable polybutylene terephthalate resin" and insert --blow-molded hollow article--;

line 64, delete "composition";

line 66, after "A" delete "blow-moldable polybutylene terephthalate resin" and insert --blow-molded hollow article--;

line 67, delete "composition".

Column 11, line 4, after "A" delete "blow-moldable polybutylene terephthalate resin" and insert --blow-molded hollow article--.

Signed and Sealed this

Twentieth Day of June, 1995

Attest:

BRUCE LEHMAN

*Attesting Officer*  *Commissioner of Patents and Trademarks*